United States Patent
Neely et al.

(10) Patent No.: US 10,263,545 B2
(45) Date of Patent: Apr. 16, 2019

(54) MOTOR VELOCITY CONTROL WITHIN AN AIRCRAFT HYDRAULIC SYSTEM

(71) Applicant: Eaton Intelligent Power Limited, Dublin (IE)

(72) Inventors: John David Neely, Kentwood, MI (US); John Mendenhall White, Strasburg, VA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/760,147

(22) PCT Filed: Sep. 9, 2016

(86) PCT No.: PCT/US2016/051007
§ 371 (c)(1),
(2) Date: Mar. 14, 2018

(87) PCT Pub. No.: WO2017/048600
PCT Pub. Date: Mar. 23, 2017

(65) Prior Publication Data
US 2018/0269815 A1    Sep. 20, 2018

Related U.S. Application Data

(60) Provisional application No. 62/218,134, filed on Sep. 14, 2015.

(51) Int. Cl.
*H02P 6/17* (2016.01)
*H02P 6/00* (2016.01)
(Continued)

(52) U.S. Cl.
CPC ............... *H02P 6/17* (2016.02); *F04B 49/20* (2013.01); *H02P 6/00* (2013.01); *H02P 23/14* (2013.01);
(Continued)

(58) Field of Classification Search
CPC ...... H02P 1/00; H02P 1/46; H02P 3/00; H02P 6/00; H02P 6/14; H02P 3/18; H02P 7/00;
(Continued)

(56) References Cited

U.S. PATENT DOCUMENTS

2011/0084638 A1* 4/2011 Patel ................... B60K 1/02
318/400.32
2013/0342140 A1   12/2013 Weslati et al.

FOREIGN PATENT DOCUMENTS

JP    2005-051865 A    2/2005
WO    2015/066219 A1   5/2015

OTHER PUBLICATIONS

International Search Report and Written Opinion of the International Searching Authority for corresponding International Patent Application No. PCT/US2016/051007 dated Dec. 21, 2016, 13 pages.

* cited by examiner

Primary Examiner — Anthony M Paul
(74) Attorney, Agent, or Firm — Merchant & Gould P.C.

(57) ABSTRACT

A system comprises an aircraft hydraulic system motor, a position sensor, and a programmable controller. The aircraft hydraulic system motor includes a rotor whose position is detected by the position sensor. The position sensor produces an output representative of that position. The programmable controller is configured to receive the output of the position sensor and calculate an estimated velocity of the aircraft hydraulic system motor based on the output of the position sensor. The calculation of the estimated velocity comprises determining both a high bandwidth velocity estimation and a low bandwidth velocity estimation. The programmable controller is additionally configured to compare the estimated velocity to a desired velocity and direct the
(Continued)

aircraft hydraulic system motor to increase or decrease velocity based on the comparison.

20 Claims, 2 Drawing Sheets

(51) Int. Cl.
    *H02P 23/14*     (2006.01)
    *F04B 49/20*     (2006.01)
    *F04B 49/06*     (2006.01)

(52) U.S. Cl.
    CPC ........ *F04B 49/065* (2013.01); *H02P 2205/07* (2013.01)

(58) Field of Classification Search
    CPC .. H02P 9/00; H02P 23/00; H02P 25/00; H02P 27/00; H02P 27/04
    USPC ........ 244/2, 24, 76 R, 158.1, 182, 191, 192, 244/76 A, 76 B, 189, 221, 4 R, 226, 227, 244/228, 110 A; 701/1, 3, 70, 507; 417/1, 22, 42, 237, 321; 318/700, 701, 318/721, 727, 779, 799, 800, 430
    See application file for complete search history.

MOTOR VELOCITY CONTROL WITHIN AN AIRCRAFT HYDRAULIC SYSTEM

CROSS-REFERENCE TO RELATED APPLICATION

This application is a National Stage Application of PCT/US2016/051007, filed on Sep. 9, 2016, which claims the benefit of U.S. Patent Application Ser. No. 62/218,134, filed on Sep. 14, 2015, the disclosures of which are incorporated herein by reference in their entireties. To the extent appropriate, a claim of priority is made to each of the above disclosed applications.

FIELD OF THE DISCLOSURE

The present disclosure generally relates to aircraft hydraulic systems and, more particularly, to controlling the velocity of a motor within an aircraft hydraulic system.

BACKGROUND OF THE DISCLOSURE

A hydraulic system uses a fluid under pressure to drive machinery or move mechanical components. In the aviation industry, virtually all aircraft make use of some hydraulically powered components. Depending upon the aircraft concerned, a single hydraulic system, or two or more hydraulic systems working together, may be used to power any or all of the following components: wheel brakes, nose wheel steering, landing gear retraction/extension, flaps and slats, thrust reversers, spoilers/speed brakes, flight control surfaces, cargo doors/loading ramps, windshield wipers, propeller pitch control. An aircraft hydraulic system will typically comprise the hydraulic fluid and three major mechanical components. Those components are the hydraulic pump which generates pressure, the hydraulically powered motor which powers the component (e.g., hydraulic actuator, hydraulic cylinder) concerned, and the system plumbing which contains and channels the fluid through the aircraft as required.

Several types of hydraulic pumps driven by a variety of power sources can be found in aviation applications. The pumps include gear pumps which are fixed displacement type pumps that move a specific amount of fluid per rotation, fixed displacement piston pumps which utilize a piston moving in a cylinder to pressurize fluid and move a specific amount of fluid with each stroke, and variable displacement pumps which are the most common types of pumps found on large aircrafts and can compensate for changes in the system demand by increasing/decreasing fluid output to maintain a near constant system pressure.

The motive power for these pumps has traditionally been generated by an engine; engine driven pumps are frequently mounted on the engine accessory gear box However, there is a trend in the aviation industry toward a more electrically based aircraft, e.g., replacing mechanical controls with electronic controls, to increase reliability, improve power quality, and reduce weight. The move to electronic controls allows for use of smaller and more efficient motors such as permanent magnet AC motors. The control of these electrical motors requires precise sensing and measurement of the angular rotor position of the motor to monitor and control velocity of the motor. Traditional position sensing methods have used various types of Hall effect sensors, resolvers, and encoders to provide a control-system usable angular position signal. This angular position signal/measurement has traditionally then been used with combinations of hardware and algorithms, or only algorithmic methods, to calculate velocity based on the change in angular measurement, e.g., $$\frac{\Delta position}{\Delta time}.$$

However, current systems/methods for determining velocity have notable limitations. Some of these limitations include hardware-based methods that require expensive, decoder integrated circuits, hardware-based methods that increase parts count lowering MTBF (mean time between failures), and algorithmic-based methods whose design and implementation can add an undesired lag to the angular measurement which can result in reduced performance.

SUMMARY

A first aspect of the disclosure is directed to a system comprising an aircraft hydraulic system motor, a position sensor, and a programmable controller. The aircraft hydraulic system motor includes a rotor whose position is detected by the position sensor. The position sensor produces an output representative of that position. The programmable controller is configured to receive the output of the position sensor and calculate an estimated velocity of the aircraft hydraulic system motor based on the output of the position sensor. The calculation of the estimated velocity comprises determining both a high bandwidth velocity estimation and a low bandwidth velocity estimation. The programmable controller is additionally configured to compare the estimated velocity to a desired velocity and direct the aircraft hydraulic system motor to increase or decrease velocity based on the comparison.

Another aspect of the disclosure is directed to a system comprising an aircraft hydraulic system motor, a position sensor, an aircraft hydraulic system pump, and a programmable controller. The aircraft hydraulic system motor includes a rotor whose position is detected by the position sensor. The position sensor produces an output representative of that position. The aircraft hydraulic system pump is coupled to the aircraft hydraulic system motor. The programmable controller is configured to receive the output of the position sensor and calculate an estimated velocity of the aircraft hydraulic system motor based on the output of the position sensor. The calculation of the estimated velocity comprises determining both a high bandwidth velocity estimation and a low bandwidth velocity estimation. The programmable controller is additionally configured to compare the estimated velocity to a desired velocity and direct the aircraft hydraulic system motor to increase or decrease velocity based on the comparison.

Still another aspect of the disclosure is directed to a method comprising: (sensing the position of a rotor of an aircraft hydraulic system motor; (2) calculating an estimated velocity of the aircraft hydraulic system motor based on the sensed position of the rotor by calculating both a high bandwidth velocity estimation and a low bandwidth velocity estimation and adding the high and low velocity estimations; (3) comparing the estimated velocity of the aircraft hydraulic system motor to a desired velocity; and (4) directing the aircraft hydraulic system motor to increase or decrease velocity based on the velocity comparison.

The above summary is not intended to describe each embodiment or every implementation. A more complete understanding will become apparent and appreciated by

DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure is directed to an electric motor drive configuration for an aircraft hydraulic pump or aircraft actuator that estimates motor velocity from successive rotor angle measurements from a magnetic encoder. The electric motor drive configuration offers a robust, more reliable and more economical solution. More specifically, the architecture of the configuration reduces reliance on expensive, highly custom integrated circuits by, instead, using velocity estimation. The velocity estimation may be implemented within a programmable controller, e.g., processor, microprocessor, field programmable gate array (FPGA). Further, the architecture allows for use of a lower cost and lower resolution rotor position sensor.

Figure 1:
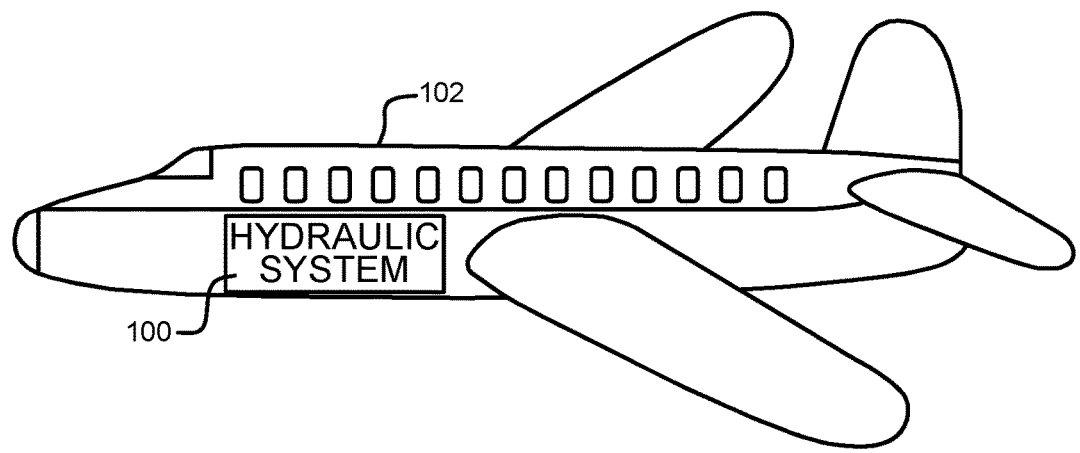
FIG. 1 is a simplified schematic of an aircraft and a hydraulic system employed therein.

Referring now to FIG. 1 it may be understood that a hydraulic system 100 is an essential and important element of an aircraft 102 that may be used for powering, through various hydraulic pumps and hydraulic actuators, numerous aircraft components. These components may include, for example: wheel brakes, nose wheel steering, landing gear retraction/extension, flaps and slats, thrust reversers, spoilers/speed brakes, flight control surfaces, cargo doors/loading ramps, windshield wipers, and propeller pitch control.

Figure 2:
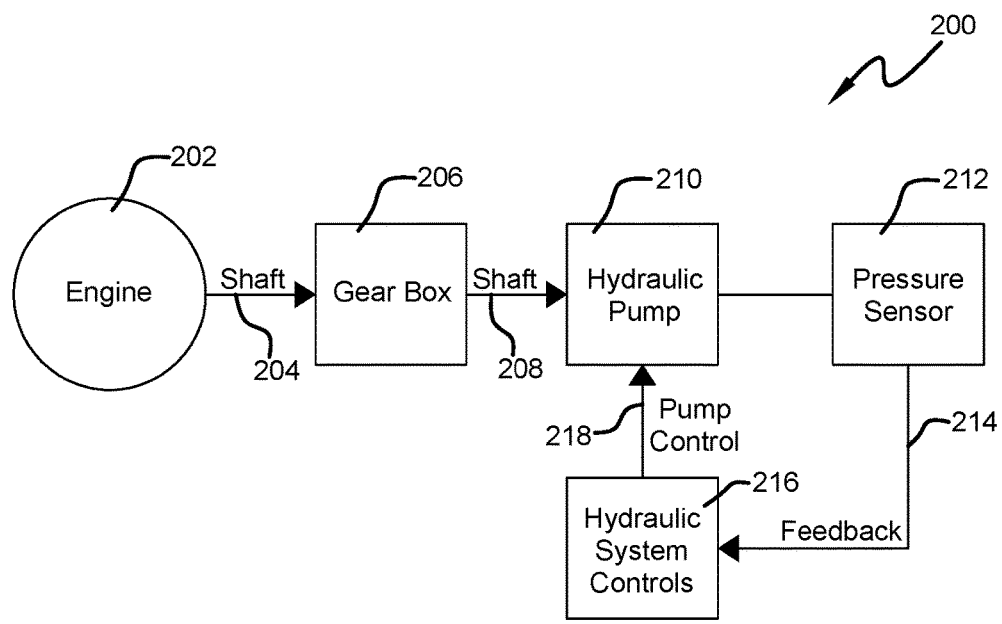
FIG. 2 is a schematic of an engine driven hydraulic pump configuration within a hydraulic system of an aircraft.

As mentioned in the "Background of the Disclosure," the hydraulic pump of an aircraft hydraulic system has most typically been driven by an engine. FIG. 2 illustrates the basic configuration of an engine-driven hydraulic pump of an aircraft with feedback control. As shown, the engine driven hydraulic pump configuration 200 includes an engine 202 whose drive shaft 204 is coupled to a gear box 206. A drive shaft 208 of the gear box 206 is coupled to a variable displacement hydraulic pump 210 whose output/flow time pressure is read by a pressure sensor 212 and provided as a feedback signal 214 to the hydraulic system controls 216. The hydraulic system controls 216 would typically operate to maintain the output/flow time pressure of the hydraulic pump, through pump control 218, at a desired level by increasing/decreasing the velocity of the hydraulic pump 210 in response to the actual output/flow time pressure as measured by the pressure sensor 212; output/flow time pressure depending on the velocity at which the hydraulic fluid is made to flow. Inherent in the engine driven hydraulic pump configuration 200 is the lag in pressure readings provided by pressure sensor 212 to the hydraulic system controls 216.

Figure 3:
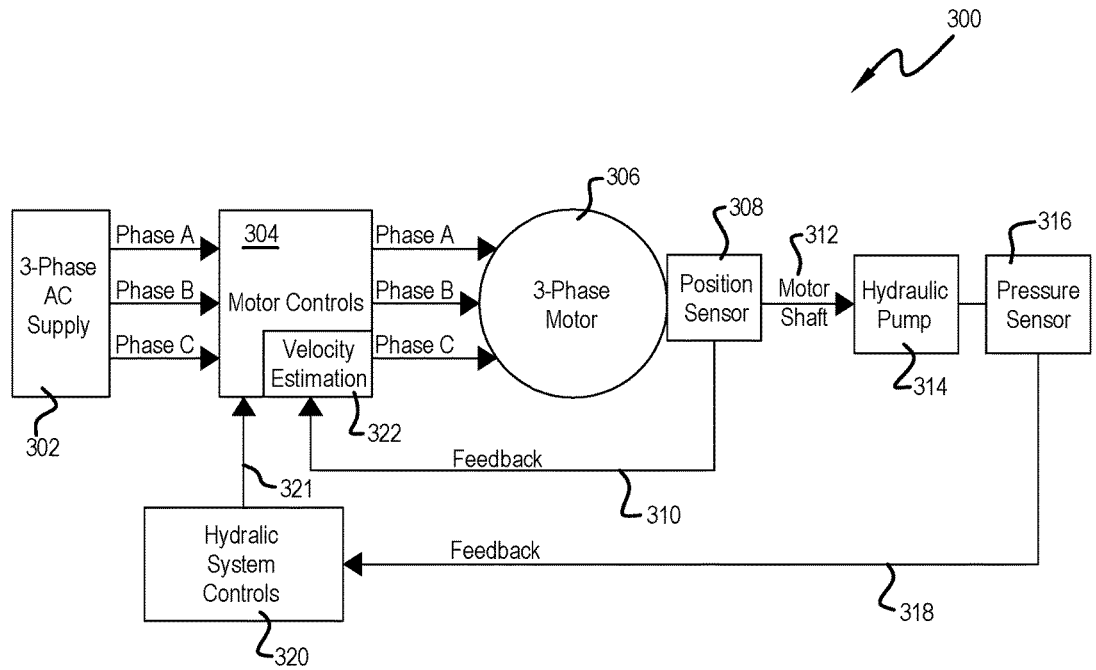
FIG. 3 is a schematic of an electric motor driven hydraulic pump configuration within a hydraulic system of an aircraft.

FIG. 3 illustrates an example configuration of a three-phase AC motor driven hydraulic pump of an aircraft with feedback control in accordance with various embodiments of the present disclosure. As shown, the AC motor driven hydraulic pump configuration 300 includes a three-phase AC supply 302 which is electrically coupled to motor controls 304. The motor controls 304 are electrically coupled to a three-phase motor 306. The three-phase motor 306 incorporates a rotor (not shown) whose angular/rotational position is detected by a position sensor 308 whose output 310 is provided as feedback to the motor controls 304. The drive shaft 312 of the motor 308 is coupled to a variable displacement hydraulic pump 312 whose output/flow time pressure is read by a pressure sensor 316 and provided as a feedback signal 318 to hydraulic system controls 320. The hydraulic system controls 320 compare the reading from the pressure sensor 316 to a desired pressure set point to generate a speed command that may be supplied as an input 321 to the motor controls 304. The motor controls 304 then use the position feedback from the output 310 of position sensor 308 to determine how to energize the motor 306 (commutation) and further use the position feedback to determine the velocity of the motor 306 which can be compared to the speed command for appropriate velocity adjustment of the motor 306. Notably, the AC motor driven hydraulic pump configuration 300 is provided with two feedback loops, one provided by the position sensor 308 and the other provided by the pressure sensor 316.

The feedback provided by the position sensor 308 is virtually instantaneous enabling a more accurate and tighter control of the speed of the motor 306, which results in more accurate and tighter control of the output/flow time pressure of the hydraulic pump 314. In one example embodiment, the position sensor 308 comprises a low-cost, commercially available rotary, incremental encoder. The output of the incremental encoder comprises a digital, A and B pulse output, e.g., quadrature outputs that are 90 deg. out of phase. The two outputs are decoded to produce a count up pulse, e.g., the rotor has moved clockwise, or a count down pulse, e.g., the rotor has moved counter clockwise. More specifically, the encoder reports an incremental change in rotor position. The number of increments provided by the encoder within 360 deg. determines the resolution of the encoder. An incremental encoder having 512 increments has been found suitable for the present application, other encoder resolutions may be used as desired.

Figure 4:
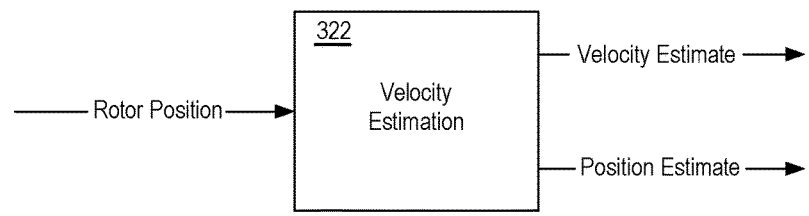
FIG. 4 is a simplified schematic illustrating the determination of velocity based on a rotor position input.

The output of the incremental encoder position sensor 308 may be decoded by a programmable device 322, e.g., processor, microprocessor, field programmable gate array (FPGA), within the motor controls 304 to obtain a rotor position. The rotor position may then be utilized by the programmable device 322 to determine an estimated velocity and estimated position, see the simplified block diagram of FIG. 4, in accordance with the following equations that have been programmed into the programmable device.

The first equation is utilized to determine a position estimate of the rotor.

$$\theta_{estimate} = \left(\left((\omega_{slow} + \omega_{fast}) \times \left[\frac{T_{svest}}{(1-z^{-1})}\right]\right) + \left(\omega_{slow} \times \frac{T_{svest}}{2}\right)\right) \quad \text{Eq. (1)}$$

Where:
$\omega_{fast}$=a high bandwidth velocity estimation of the rotor
$\omega_{slow}$=a low bandwidth velocity estimation of the rotor
$T_{svest}$=sample time
z=z domain variable (complex frequency representation)

The high bandwidth velocity estimation is provided by Equation 2.

$$\omega_{fast} = (wfast\_gain \times \theta_{error\ dead\ zone}) \quad \text{Eq. (2)}$$

Where:
wfast_gain=proportional gain constant
Note that as position error increases, the gain value of wfast_gain is proportionally added as feedback to the speed estimate. The intent is to quickly, with a large gain value, adjust the speed estimate to back within the error band provided by the dead zone function, described below. When the dead zone function output is zero then the wfast gain value is zero.

$\theta_{error\ dead\ zone}$ is calculated according to the following equation and table.

$$\theta_{error} = \text{modulus}((\text{modulus}(\theta_{mechanical}, 2\pi) - \text{modulus}(\theta_{estimate}, 2\pi)), 2\pi) \quad \text{Eq. (3)}$$

Where:
$\theta_{mechanical}$=rotor position measured by position sensor
$\theta_{estimate}$=result of Eq. (1)

TABLE 1

| Input, $\theta_{error}$ | Output, $\theta_{error\ dead\ zone}$ |
| --- | --- |
| $\theta_{error} \geq$ lower limit; and $\theta_{error} \leq$ upper limit | 0 |
| $\theta_{error} >$ upper limit | $\theta_{error}$ − upper limit |
| $\theta_{error} <$ lower limit | $\theta_{error}$ − lower limit |

Where, the upper limit and the lower limits are constants based on the encoder minimum sensor resolution range (+/−). Once an encoder is chosen, the limits are fixed in the implementation The low bandwidth velocity estimation of the rotor is provided by Equation (4).

$$\omega_{slow} = \frac{z-1}{\left(z\left(\tau + \frac{T}{2}\right) - \left(\tau - \frac{T}{2}\right)\right)} (\text{position error}) \quad \text{Eq. (4)}$$

Where:

$$\text{position error} = (\theta_k - \theta_{k-1})$$

$\tau$=filter time constant (slow$_{tc}$)
T =sampling time($v_{est_{ts}}$)
$\theta_k$=present rotor angle sample
$\theta_{k-1}$=previous rotor angle sample
The final velocity estimate is provided by Equation (5).

$$\omega_{estimate} = \omega_{fast} + \omega_{slow} \quad \text{Eq. (5)}$$

Note that both velocity estimations, $\omega_{fast}$ and $\omega_{slow}$, are constantly active in obtaining the final velocity estimate. However, $\omega_{fast}$ fast is normally zero when the position error is very small, e.g., the fast velocity estimation does not contribute to the combined velocity estimation inside a dead zone. Ideally, $\omega_{fast}$ fast is larger than zero when there is a position error and as the position error gets smaller, e.g., the position tracker is tracking and therefore the velocity is accurate, the $\omega_{slow}$ estimate becomes the dominate value of the velocity estimate.

Once the estimated velocity has been calculated as described above, the motor controls 304 operate to maintain the output/flow time pressure of the hydraulic pump 314 at a desired level by increasing/decreasing the velocity of the motor 306 in response to the velocity estimation calculated by the programmable device 322 based on the rotor position provided by position sensor 308 and in response to the torque or speed command provided by the hydraulic system controls 320.

Using motor velocity estimation, as described above, to control the AC motor driven hydraulic pump within an aircraft hydraulic system provides for a high performance motor drive that utilizes a velocity estimate that has low lag (relative to actual velocity) and offers good transient response to changes in velocity. Further, feedback control with motor velocity estimation reduces part count, (e.g., eliminating the need for complex integrated circuits (ICs)), improves reliability within the hydraulic system and improves MTBF (mean time between failures). Moreover, the motor velocity estimation, as described above, produces a low-lag, high-bandwidth velocity estimate and provides system control that has flexibility in tuning performance using digital controls.

Systems, devices or methods disclosed herein may include one or more of the features, structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. A system comprising:
   an aircraft hydraulic system motor having a rotor;
   a position sensor configured to detect the position of the rotor and to produce an output reflective of that position; and
   a programmable controller configured to:
     receive the output of the position sensor;
     calculate an estimated velocity of the aircraft hydraulic system motor based on the output of the position sensor, wherein the calculation of the estimated velocity comprises determining both a high bandwidth velocity estimation and a low bandwidth velocity estimation;
     compare the estimated velocity to a desired velocity; and
     direct the aircraft hydraulic system motor to increase or decrease velocity based on the comparison.

2. The system of claim 1, wherein the programmable controller is additionally configured to determine a position estimate of the rotor position based on the output of the position sensor.

3. The system of claim 2, wherein the position estimate is further based on the high bandwidth velocity estimation and the low bandwidth velocity estimation.

4. The system of claim 1, wherein the low bandwidth velocity estimation is based on a position error of the rotor, wherein the position error represents the difference between a first output of the position sensor occurring at a first time and a second output of the position sensor occurring at a second time.

5. The system of claim 4, wherein the high bandwidth velocity estimation is added to the low bandwidth velocity estimation to adjust the estimated velocity back into an acceptable error band if the estimated velocity is outside an acceptable error band.

6. The system of claim 1, wherein the estimated velocity comprises the high bandwidth velocity estimation added to the low bandwidth velocity estimation.

7. The system of claim 1, wherein the position sensor comprises a commercially available encoder.

8. A system comprising:
an aircraft hydraulic system motor having a rotor;
a position sensor configured to detect the position of the rotor and to produce a position output representative of that position;
an aircraft hydraulic system pump coupled to the aircraft hydraulic system motor; and
a programmable controller configured to:
receive the position output;
calculate an estimated velocity of the aircraft hydraulic system motor based on the position output, wherein the calculation of the estimated velocity comprises determining both a high bandwidth velocity estimation and a low bandwidth velocity estimation;
compare the estimated velocity to a desired velocity; and
direct the aircraft hydraulic system motor to increase or decrease velocity based on the velocity comparison.

9. The system of claim 8, pressure sensor configured to detect the output/flow time pressure of the aircraft hydraulic system pump and produce a pressure output representative of the detected pressure.

10. The system of claim 9, the programmable controller additionally configured to receive the pressure output, compare the second output to a desired output/flow time pressure and direct the aircraft hydraulic system motor to increase or decrease velocity based on the pressure comparison.

11. The system of claim 8, wherein the estimated velocity comprises the high bandwidth velocity estimation added to the low bandwidth velocity estimation.

12. The system of claim 8, wherein the programmable controller is additionally configured to determine a position estimate of the rotor position based on the position output.

13. The system of claim 12, wherein the position estimate is further based on the high bandwidth velocity estimation and the low bandwidth velocity estimation.

14. The system of claim 8, wherein the low bandwidth velocity estimation is based on a position error of the rotor, wherein the position error represents the difference between a first position output of the position sensor occurring at a first time and a second position output of the position sensor occurring at a second time.

15. The system of claim 14, wherein the high bandwidth velocity estimation is added to the low bandwidth velocity estimation to adjust the estimated velocity back into an acceptable error band if the estimated velocity is outside an acceptable error band.

16. A method comprising:
sensing the position of a rotor of an aircraft hydraulic system motor;
calculating an estimated velocity of the aircraft hydraulic system motor based on the sensed position of the rotor by calculating both a high bandwidth velocity estimation and a low bandwidth velocity estimation, and adding the high and low velocity estimations;
comparing the estimated velocity of the aircraft hydraulic system motor to a desired velocity; and
directing the aircraft hydraulic system motor to increase or decrease velocity based on the velocity comparison.

17. The method of claim 16, further comprising calculating an estimated position of the rotor based on the sensed position.

18. The method of claim 16, further comprising calculating an estimated position of the rotor based on the sensed position, the high bandwidth velocity estimation and the low bandwidth velocity estimation.

19. The method of claim 16, wherein the low bandwidth velocity estimation is based on a position error of the rotor, wherein the position error represents the difference between a first sensed position of the rotor occurring at a first time and a second sensed position of the rotor occurring at a second time.

20. The system of claim 16, wherein the high bandwidth velocity estimation is added to the low bandwidth velocity estimation to adjust the estimated velocity back into an acceptable error band if the estimated velocity is outside an a acceptable error band.

* * * * *